US009025644B2

(12) United States Patent
Arkhipenkov

(10) Patent No.: US 9,025,644 B2
(45) Date of Patent: May 5, 2015

(54) TRANSMITTING/RECEIVING SYSTEM

(75) Inventor: Vladimir Yakovlevich Arkhipenkov, Mytishchi (RU)

(73) Assignee: Samsung Electronics Co., Ltd (KR)

( * ) Notice: Subject to any disclaimer, the term of this patent is extended or adjusted under 35 U.S.C. 154(b) by 1008 days.

(21) Appl. No.: 12/880,494

(22) Filed: Sep. 13, 2010

(65) Prior Publication Data
US 2011/0064125 A1   Mar. 17, 2011

(30) Foreign Application Priority Data

Sep. 11, 2009 (RU) ................................. 2009133968

(51) Int. Cl.
*H04B 1/38* (2006.01)
*H04L 5/16* (2006.01)
*H04B 7/155* (2006.01)

(52) U.S. Cl.
CPC ..................................... *H04B 7/155* (2013.01)

(58) Field of Classification Search
USPC .................................. 375/219, 220, 295, 316
See application file for complete search history.

(56) References Cited

U.S. PATENT DOCUMENTS

| 6,609,010 | B1 * | 8/2003 | Dolle et al. | 455/552.1 |
| 7,356,325 | B2 * | 4/2008 | Behzad et al. | 455/323 |
| 7,386,278 | B2 * | 6/2008 | Sato | 455/73 |
| 8,073,385 | B2 * | 12/2011 | Braithwaite et al. | 455/9 |
| 8,295,333 | B2 * | 10/2012 | Rofougaran et al. | 375/211 |
| 2005/0068963 | A1 | 3/2005 | Lee et al. | |
| 2005/0124307 | A1 * | 6/2005 | Ammar et al. | 455/183.2 |
| 2006/0212910 | A1 * | 9/2006 | Endres et al. | 725/73 |
| 2009/0240308 | A1 * | 9/2009 | Feher | 607/60 |

FOREIGN PATENT DOCUMENTS

| JP | 2003-348648 | 12/2003 |
| JP | 2005-130491 | 5/2005 |
| RU | 2 168 860 | 6/2001 |
| RU | 2 196 392 | 1/2003 |
| WO | WO 96/27242 | 9/1996 |
| WO | WO 2005/039094 | 4/2005 |

OTHER PUBLICATIONS

Russian Office Action dated May 6, 2010 issued in a counterpart application No. 2009133968/09.
Russian Decision to Grant dated Nov. 26, 2010 issued in a counterpart application No. 2009133968/09.

* cited by examiner

*Primary Examiner* — Freshteh N Aghdam
(74) *Attorney, Agent, or Firm* — The Farrell Law Firm, P.C.

(57) ABSTRACT

A transmitting/receiving system including a transmitter/receiver and a retransmitter. The transmitter/receiver includes an antenna, a multiplexer, a mixer, a receiver, a transmitter, an IF processor, a DSP and a control module. The retransmitter includes an antenna, a transceiver and a controller. The receiver receives a main input radio-frequency signal. The transmitter transmits a main output radio-frequency signal. The transceiver receives the main input radio-frequency signal, transforms the main input radio-frequency signal into an intermediate radio-frequency signal, and transmits the intermediate radio-frequency signal. The IF processor receives the intermediate radio-frequency signal and processes the intermediate radio-frequency signal. The DSP processes the main input radio-frequency signal with the processed intermediate radio-frequency signal. The control module forms and transmits a control signal to the controller, which sets a frequency and a power level of the intermediate radio-frequency signal.

9 Claims, 8 Drawing Sheets

TRANSMITTING/RECEIVING SYSTEM

PRIORITY

The present application claims priority under 35 U.S.C. §119(a) to a Russian patent application filed in the Russia Intellectual Property Office on Sep. 11, 2009, and assigned Serial No. 2009133968, the entire content of which is incorporated herein by reference.

BACKGROUND OF THE INVENTION

1. Field of the Invention

The present invention relates generally to area of radio communication, and more specifically, to transmitting/receiving systems for transmitting and receiving broadband digital signals, such as broadcast TV, high-speed data exchanged over wireless network, etc.

2. Description of the Related Art

FIG. 1 is a block diagram illustrating a conventional transmitter/receiver, e.g., a conventional cell phone. FIG. 2 is a block diagram illustrating another conventional transmitter/receiver, as described in U.S. Pat. No. 6,754,508.

The conventional transmitter/receivers, as illustrated in FIGS. 1 and 2 have two major drawbacks.

First, a high level of broadband digital noise is generated by digital transmitting/receiving modules. A portion of the given noise, which is concentrated inside of the demanded bandwidth of the radio-frequency channel, directly contributes to input noise of the transmitter/receiver and worsens its noise-factor. For portable transmitter/receivers, such cell phones, the situation is even worse, as the antenna is positioned too close to a digital part of the transmitter/receiver. Consequently, a filter cannot remove the digital noise, as this noise is in-band.

Second, when receiving a signal in complex conditions of multibeam distribution of the signal, which is typical for distribution in a city and inside of buildings, it is inconvenient to use Multiple Input Multiple Output (MIMO) technology and/or technology that utilizes separate receiving of a signal in mobile devices, as the distance between multiple antennas cannot be great enough, for example, for a mobile receiver, such as a cell phone. Thus, correlation between two input signals from two antennas will be very high.

SUMMARY OF THE INVENTION

The present invention is designed to substantially solve at least the above-described problems and/or disadvantages and to provide at least the advantages described below. Accordingly, an aspect of the present invention is to provide a transmitting/receiving system with decreased noise levels.

In accordance with an aspect of the present invention, a transmitting/receiving system is provided, which includes a transmitter/receiver, and a retransmitter. The transmitter/receiver includes an antenna, a multiplexer, a mixer, a receiver, a transmitter, an intermediate frequency processor, a Digital Signal Processor (DSP) and a control module. The retransmitter includes an antenna, a transceiver, and a controller. The receiver receives through the antenna and the multiplexer a main input radio-frequency signal. The transmitter transmits through the multiplexer and the antenna a main output radio-frequency signal. The transceiver receives through the antenna the main input radio-frequency signal, transforms the main input radio-frequency signal into an intermediate radio-frequency signal, and transmits, through the antenna, the intermediate radio-frequency signal. The intermediate frequency processor receives, through the antenna and the multiplexer, the intermediate radio-frequency signal and processes the signal intermediate radio-frequency signal. The DSP processes the main input radio-frequency signal with the processed intermediate radio-frequency signal. The control module forms and transmits, through transmitter, the multiplexer, the mixer, and the antenna, a control signal, and sets a frequency and a power level of the intermediate radio-frequency signal. The controller receives, through the antenna, the control signal, and changes a frequency and a power level of an intermediate radio-frequency signal according to the control signal.

In accordance with another aspect of the present invention, a transmitting/receiving system is provided, which includes a transmitter/receiver, and a retransmitter. The transmitter/receiver includes an antenna, a multiplexer, a mixer, a receiver, a transmitter, an intermediate frequency processor, a Digital Signal Processor (DSP) and a control module. The receiver receives through the antenna and the multiplexer a main input radio-frequency signal. The transmitter transmits through the multiplexer and the antenna a main output radio-frequency signal. The retransmitter includes a transceiver, a controller, a second antenna for receiving the main input radio-frequency signal, and a first antenna for transmitting of an intermediate radio-frequency signal and receiving a control signal. The transceiver includes a noiseless amplifier, a mixer, and an intermediate frequency amplifier connected to the first antenna. The controller comprises a multiplexer, a control block, and an oscillator. An input of the multiplexer is connected to the second antenna, and an output of the multiplexer is connected to an input of the noiseless amplifier, the control block is connected to the noiseless amplifier and the intermediate frequency amplifier, and the oscillator is connected to the mixer.

In accordance with another aspect of the present invention, a transmitting/receiving system is provided, which includes a transmitter/receiver, and a retransmitter. The transmitter/receiver includes an antenna, a multiplexer, a mixer, a receiver, a transmitter, an intermediate frequency processor, a Digital Signal Processor (DSP) and a control module. The receiver receives through the antenna and the multiplexer a main input radio-frequency signal. The transmitter transmits through the multiplexer and the antenna a main output radio-frequency signal. The retransmitter includes a transceiver, a controller, a second antenna for receiving the main input radio-frequency signal and receiving a control signal, and a first antenna for transmitting an intermediate radio-frequency signal. The transceiver includes a noiseless amplifier connected to the second antenna, a mixer, and an intermediate frequency amplifier. The controller includes a multiplexer, a control block, and an oscillator. The multiplexer is connected to the first antenna and the intermediate frequency amplifier, the control block is connected to the noiseless amplifier and the intermediate frequency amplifier, and the oscillator is connected to the mixer.

In accordance with another aspect of the present invention, a transmitting/receiving system is provided, which includes a transmitter/receiver and a retransmitter. The transmitter/receiver includes an antenna, a multiplexer, a mixer, a receiver, a transmitter, an intermediate frequency processor, a Digital Signal Processor (DSP) and a control module. The receiver receives through the antenna and the multiplexer a main input radio-frequency signal. The transmitter transmits through the multiplexer and the antenna a main output radio-frequency signal. The retransmitter includes a transceiver, a controller, and an antenna for receiving the main input radio-frequency signal, transmitting an intermediate radio-frequency signal, and receiving a control signal. The transceiver includes a noiseless amplifier, a mixer, and an intermediate frequency amplifier. The controller includes a multiplexer, a control block, and an oscillator. The multiplexer is connected to the antenna, the noiseless amplifier and the intermediate frequency amplifier, the control block is connected to the noiseless amplifier and the intermediate frequency amplifier, and the oscillator is connected to the mixer.

In accordance with another aspect of the present invention, a transmitting/receiving system is provided, which includes a transmitter/receiver and a retransmitter. The transmitter/receiver includes an antenna, a multiplexer, a mixer, a receiver, a transmitter, an intermediate frequency processor, a Digital Signal Processor (DSP) and a control module. The receiver receives through the antenna and the multiplexer a main input radio-frequency signal. The transmitter transmits through the multiplexer and the antenna a main output radio-frequency signal. The retransmitter includes a transceiver, a controller, a second antenna for receiving the main input radio-frequency signal, and a first antenna for transmitting an intermediate radio-frequency signal, and receiving a control signal. The transceiver includes an adjustable filter, which is connected to the second antenna, for increasing electromagnetic compatibility, a noiseless amplifier, a mixer, and an intermediate frequency amplifier. The controller includes a multiplexer, a control block, and an oscillator. The multiplexer is connected to the first antenna and the intermediate frequency amplifier, the control block is connected to the noiseless amplifier and the intermediate frequency amplifier, and the oscillator is connected to the mixer.

In accordance with another aspect of the present invention, a transmitting/receiving system is provided, which includes a transmitter/receiver and a retransmitter. The transmitter/receiver includes an antenna, a multiplexer, a mixer, a receiver, a transmitter, an intermediate frequency processor, a Digital Signal Processor (DSP) and a control module. The receiver receives through the antenna and the multiplexer a main input radio-frequency signal. The transmitter transmits through the multiplexer and the antenna a main output radio-frequency signal. The retransmitter includes a transceiver, a controller, a second antenna for receiving the main input radio-frequency signal, and a first antenna for transmitting an intermediate radio-frequency signal and receiving a control signal. The transceiver includes a noiseless amplifier connected to the second antenna, a first mixer, a pseudo-noise modulator that increases multiuser compatibility, a second mixer, and an intermediate frequency amplifier. The controller includes a multiplexer, a control block, a first oscillator, and a second oscillator. The multiplexer is connected to the first antenna and the intermediate frequency amplifier, the control block is connected to the noiseless amplifier and the intermediate frequency amplifier, the first oscillator is connected to the first mixer, and the second oscillator is connected to the second mixer.

BRIEF DESCRIPTION OF THE DRAWINGS

The above and other aspects, features, and advantages of certain embodiments the present invention will become more apparent from the following detailed description when taken in conjunction with the accompanying drawings in which.

Throughout the drawings, like reference numerals will be understood to refer to like parts, components and structures.

DETAILED DESCRIPTION OF EMBODIMENTS OF THE INVENTION

Various embodiments of the present invention will be described herein below with reference to the accompanying drawings. In the following description, well-known functions or constructions are not described in detail to avoid obscuring the present invention in unnecessary detail.

Figure 1:
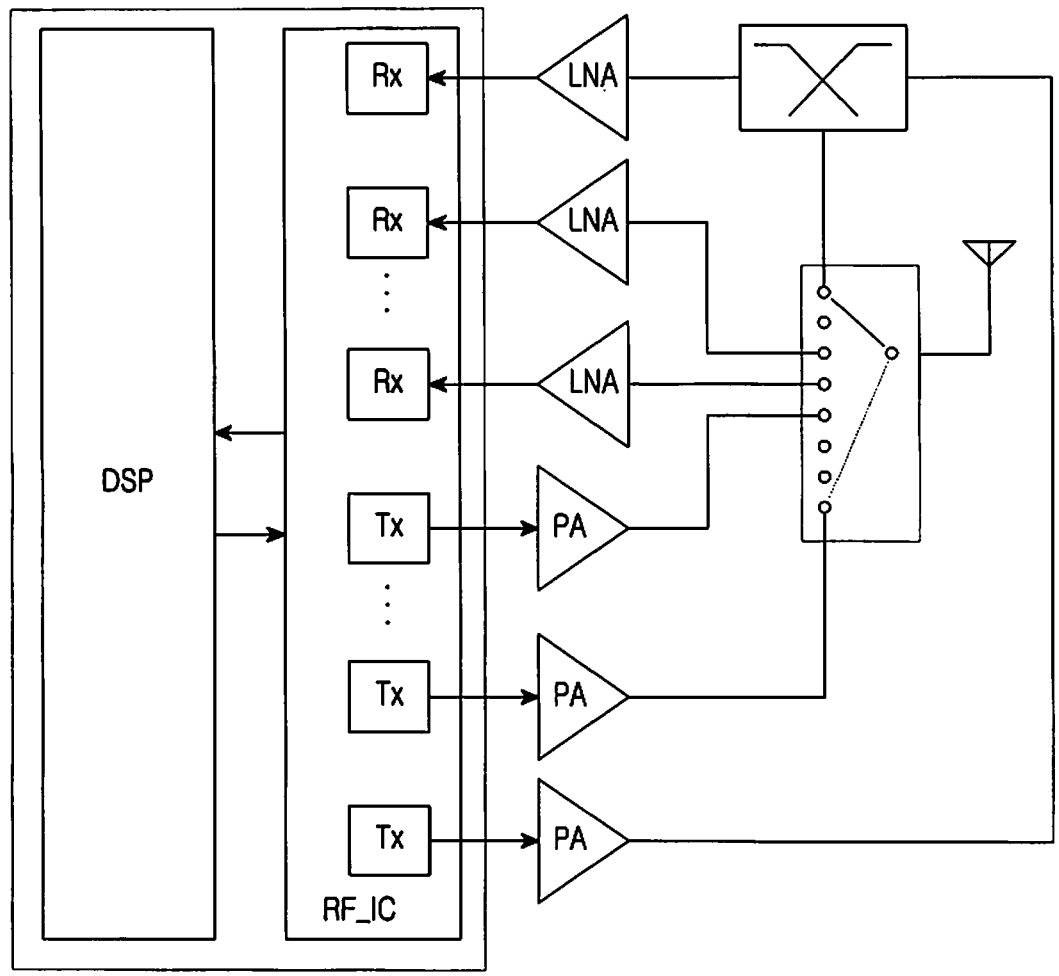
FIG. 1 is a block diagram illustrating a conventional transmitter/receiver.
Figure 2:
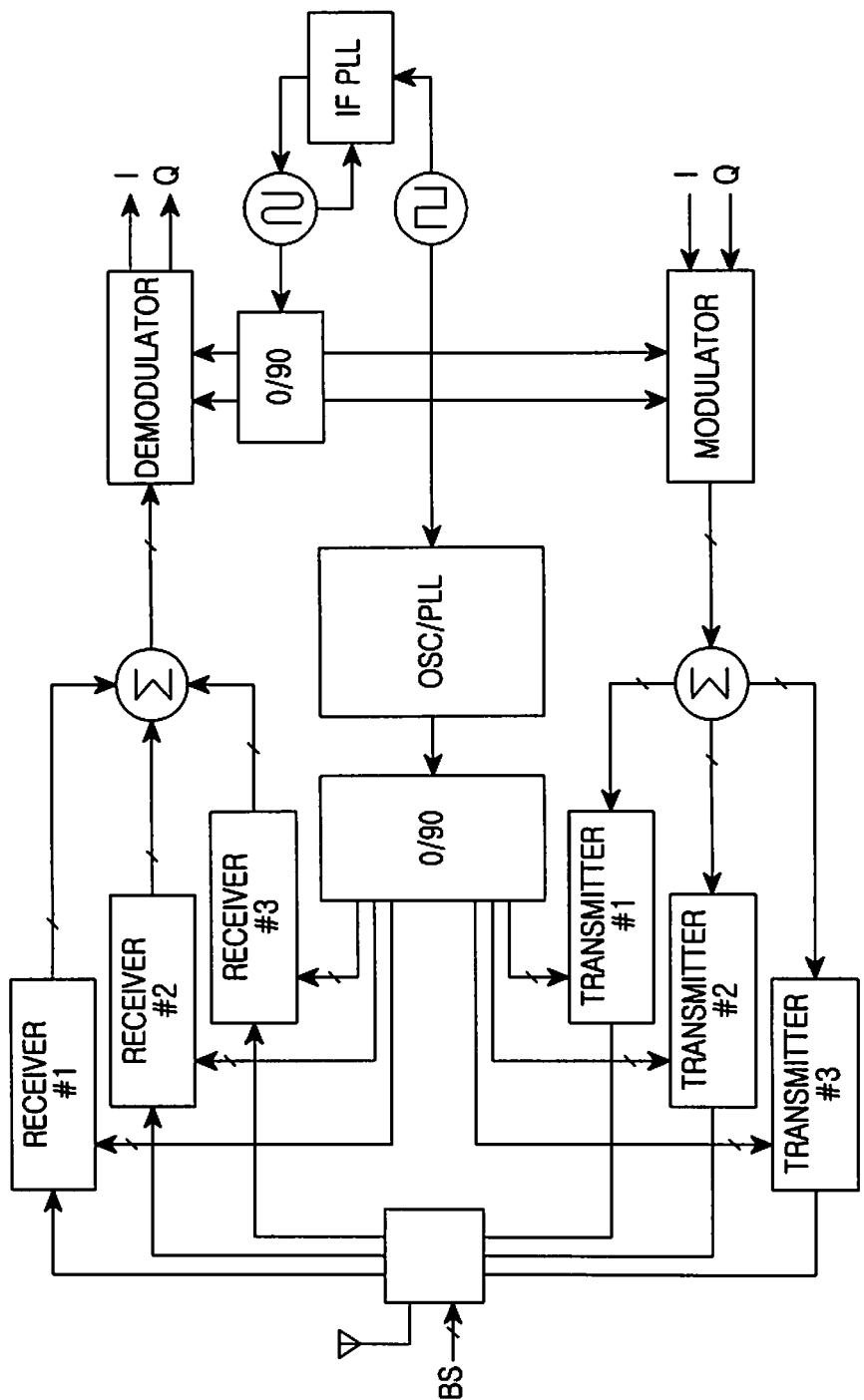
FIG. 2 is a block diagram illustrating another conventional transmitter/receiver.
Figure 3:
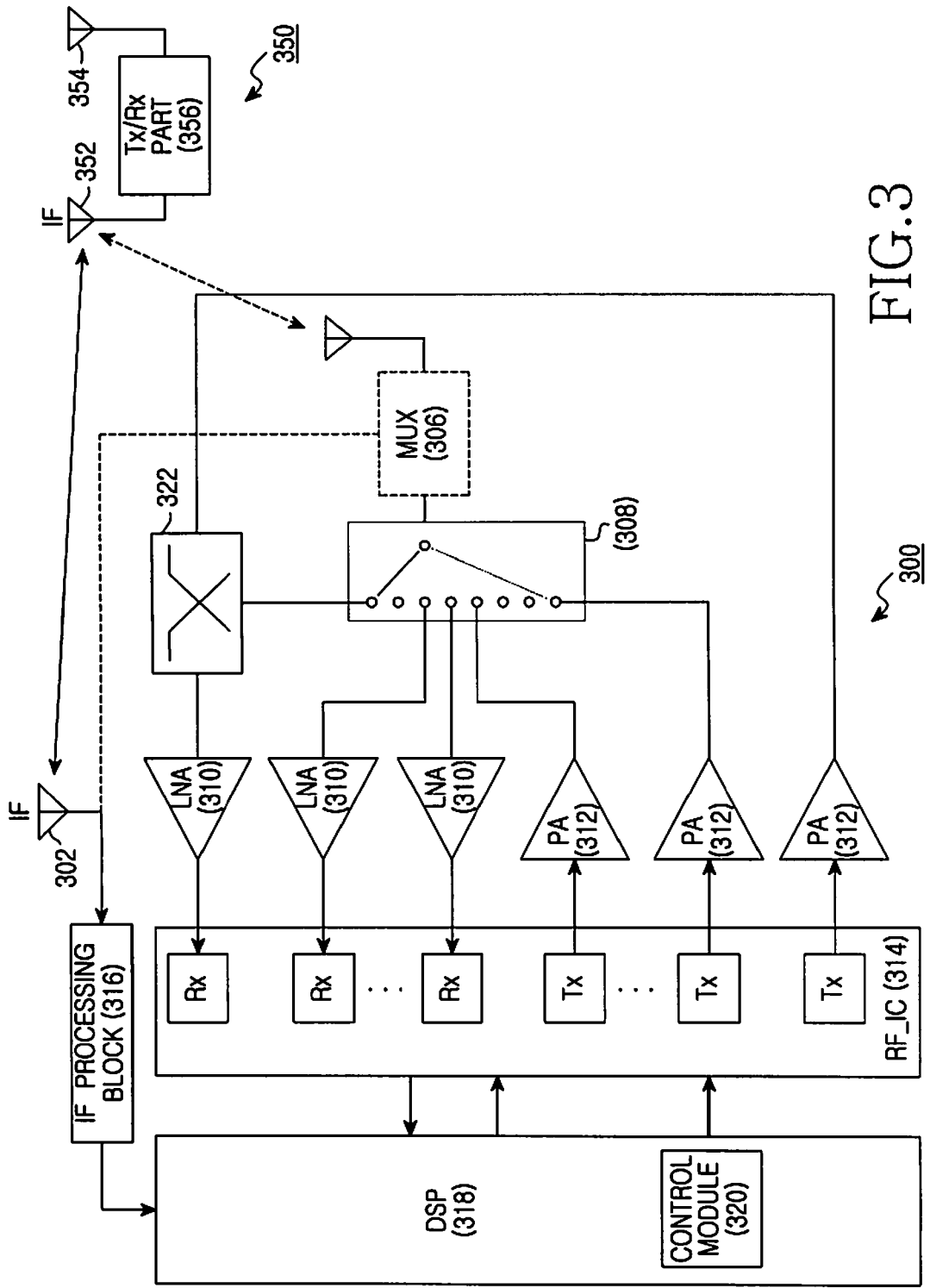
FIG. 3 is a block diagram illustrating a transmitter/receiver of a transmitting/receiving system, according to an embodiment of the present invention.

FIG. 3 is a block diagram of transmitter/receiver of a transmitting/receiving system, according to an embodiment of the present invention.

The transmitting/receiving system includes the transmitter/receiver 300 and a retransmitter 350.

The transmitter/receiver 300 includes a first antenna 302 and a second antenna 304. The second antenna is connected to a multiplexer (MUX) 306, which is connected to a switch 308, which is selectively connects to a receiving part, a transmitting part, and a filter 322. The receiving part includes Low Noise Amplifiers (LNAs), e.g., noiseless amplifiers, 310 the separate receivers (Rx) of an Integrated Circuit (IC) 314. The transmitting part includes Power Amplifiers (PAs) 312 and separate transmitters of the IC 314.

The transmitter/receiver 300 also includes an Intermediate Frequency (IF) processor 316 for processing of an intermediate frequency signal of, connected to the first antenna 302 and a Digital Signal Processor (DSP). The DSP 318 includes a control module 320.

In addition, although not illustrated in FIG. 3, the transmitter/receiver 300 may also include mixers that down-convert output signals of the LNAs 310 into lower frequency signals, and mixers that up-convert output signals of the PAs 312 into higher frequency signals.

The retransmitter 350 includes antennas 352 and 354, and a transmitting/receiving part 356.

Figure 4A:
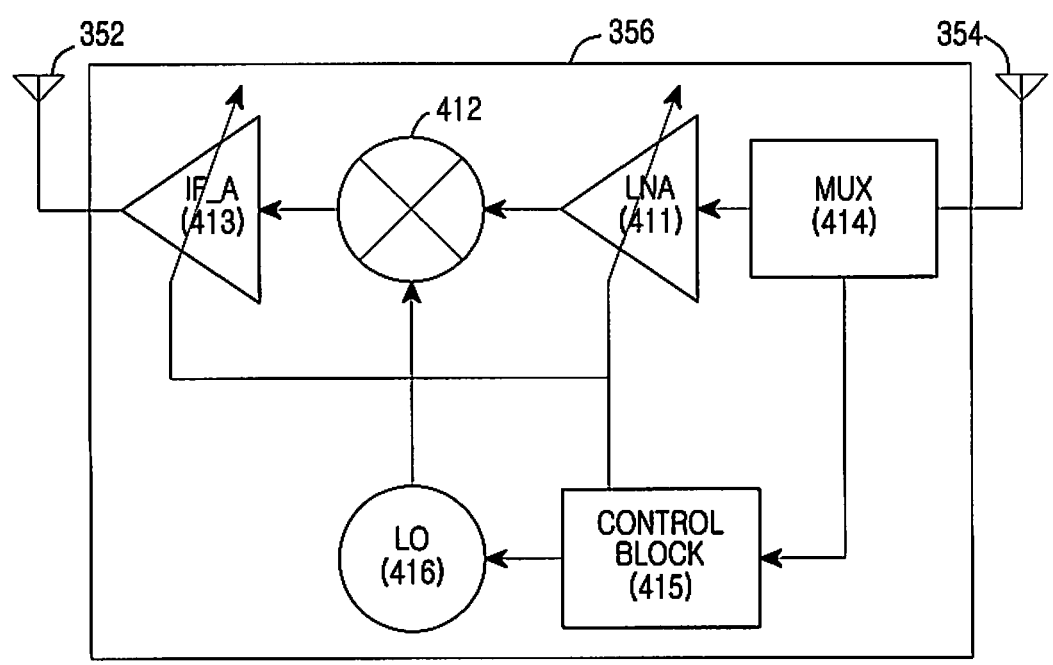
FIGS. 4A to 4E are block diagrams illustrating retransmitters of transmitting/receiving system according to embodiments of the present invention.

FIG. 4A is block diagram illustrating a retransmitter of transmitting/receiving system according to embodiments of the present invention.

Referring FIG. 4A, the transmitting/receiving part 356 of the retransmitter 350 include an LNA 411, a mixer 412, a IF Amplifier (IFA) 413, a MUX 414, a control block 415, and a Local Oscillator (LO) 416.

A main input radio-frequency signal, received by the main transmitter/receiver 300, is simultaneously received on a retransmitter 350 too. The retransmitter 350 is controlled by the main transmitter/receiver 300, the control module 320 of which sets a frequency value and power of a signal radiated by the retransmitter 350 on an intermediate frequency.

The control block 415 receives a control signal from the transmitter/receiver 300, processes the received control signal, and then controls a frequency of the LO 416 and an amplification coefficient of LNA 411 and IFA 413, based on the processed control signal.

In the retransmitter 350, as illustrated in FIG. 4A, the main radio-frequency signal is amplified by LNA 411 to provide an optimum level of noise-factor for the system, and then a frequency of the input signal is transformed into a fixed intermediate frequency, chosen as being optimum for relaying, using a mixer 412 and LO 416. The IFA 413 amplifies power of a signal to an optimum level, thereby forming a radio-frequency signal at an intermediate frequency.

In a transmitting/receiving system in accordance with an embodiment of the present invention, four input/output signals are used:

(1) a main input radio-frequency signal as an input of the retransmitter 350 and an input of the transmitter/receiver 300;

(2) a main output radio-frequency signal as an output of the transmitter/receiver 300;

(3) an intermediate radio-frequency signal as an output of a retransmitter 350 and an input of the transmitter/receiver 300; and (4) a control signal an output of the transmitter/receiver 300 and an input of the retransmitter 350.

Multiplexer 414, which may be a switched multiplexer or a frequency splitting multiplexer, is used to split the signals.

The IF processor 316 may amplify the intermediate radio-frequency signal received through the first antenna 302. That is, the IF processor 316 may include intermediate frequency amplifiers.

The DSP 318 performs joint processing the main input radio-frequency signal received via the second antenna 304 with the processed intermediate frequency radio-frequency signal received via the first antenna 302.

As described above, the retransmitter 350 can be made in several configurations.

FIGS. 4A to 4E are block diagrams illustrating retransmitters of a transmitting/receiving system according to embodiments of the present invention.

Referring again to FIG. 4A, the retransmitter 350 includes antennas 352 and 354. a transmitting/receiving part, and a control part. Antenna 354 receives a main input radio-frequency signal, and antenna 352 transmits an intermediate radio-frequency signal and receives a control signal. The transmitting/receiving part includes the LNA 411, the mixer 412, and the IFA 413, the output of which is connected to antenna 352. The control part includes the multiplexer 414, the control block 415, and the LO 416. An input of the multiplexer 414 is connected to the second antenna 354, and an output of the multiplexer 414 is connected to an input of the LNA 411. The control block 415 is connected to the LNA 411 and the IFA 413, and the LO 416 is connected to the mixer 412.

Figure 4B:
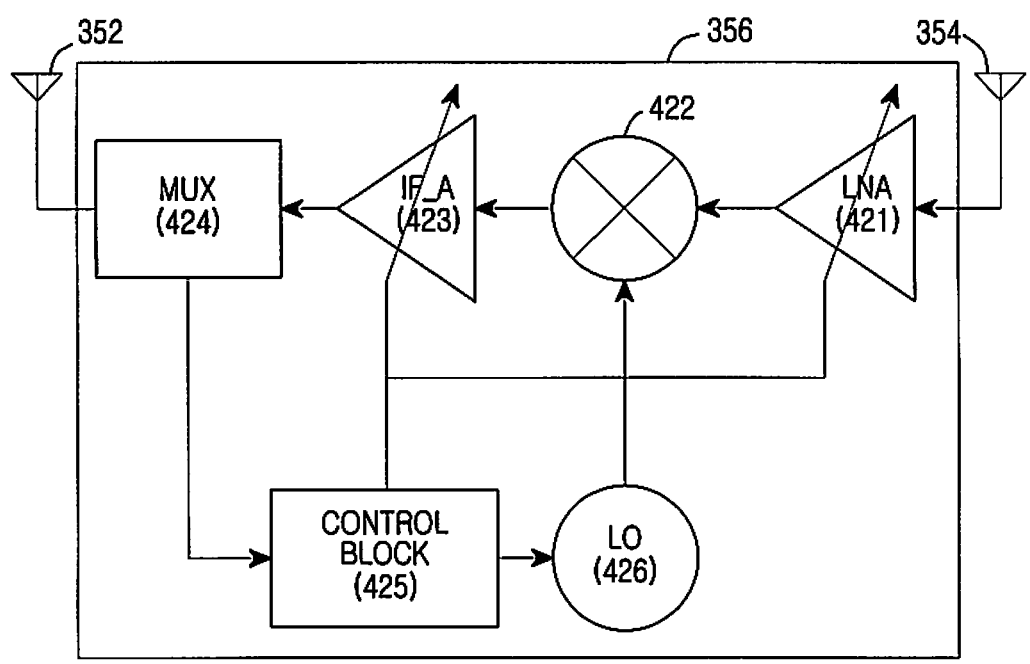

Referring to the embodiment of FIG. 4B, the retransmitter 350 includes antennas 352 and 354, a transmitting/receiving part, and a control part. Antenna 354 receives a main input radio-frequency signal and receives a control signal. Antenna 352 transmits an intermediate radio-frequency signal. The Transmitting/receiving part includes an LNA 421, which is connected to antenna 354, a mixer 422, and an IFA 423. The control part includes a multiplexer 424, a control block 425, and an LO 426. The multiplexer 424 is connected to antenna 352 and the amplifier of intermediate frequency 423. The control block 425 is connected to the LNA 421 and the IFA 423, and the LO 426 is connected to the mixer 422.

Figure 4C:
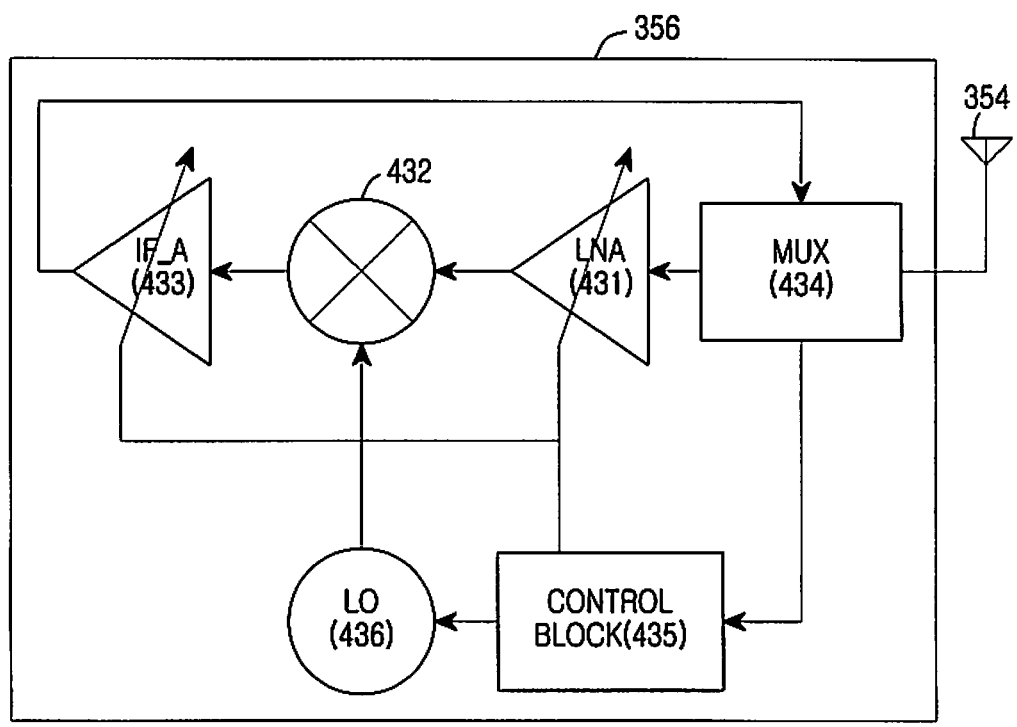

Referring to the embodiment of FIG. 4C, the retransmitter 350 includes only one broadband antenna 354, which radiates/receives all signals. Specifically, the retransmitter 350 includes the antenna 354, a transmitting/receiving part, and a control part. Antenna 354 receives a main input radio-frequency signal, transmits an intermediate radio-frequency signal, and receives a control signal. The transmitting/receiving part includes an LNA 431, a mixer 432, and an IFA 433. The control part includes a multiplexer 434, a control block 435, and an LO 436. The multiplexer 434 is connected to the antenna 354, the LNA 431, and the IFA 433. The control block 435 is connected to the LNA 431 and the IFA 433, and the LO 436 is connected to the mixer 432.

Figure 4D:
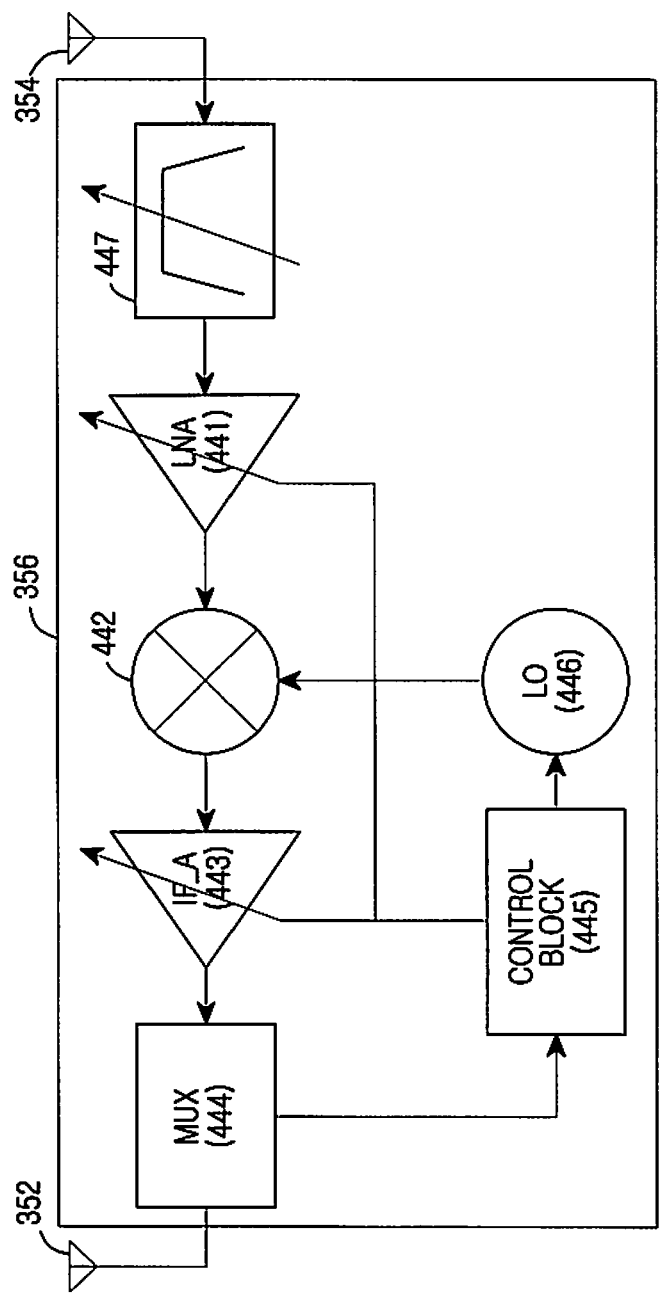

Referring to the embodiment of FIG. 4D, the retransmitter 350 includes antennas 352 and 354, a transmitting/receiving part, and a control part. Antenna 354 receives a main input radio-frequency signal, and antenna 352 transmits an intermediate radio-frequency signal and receives a control signal. The transmitting/receiving part includes an adjustable filter 447, which is connected to antenna 354, for increasing electromagnetic compatibility, an LNA 441, a mixer 442 and an IFA 443. The control part includes a multiplexer 444, a control block 445, and an LO 446. The multiplexer 444 is connected to antenna 352 and the IFA 443. The control block 445 is connected to the LNA 441 and the IFA 443, and the LO 446 is connected to the mixer 442.

Figure 4E:
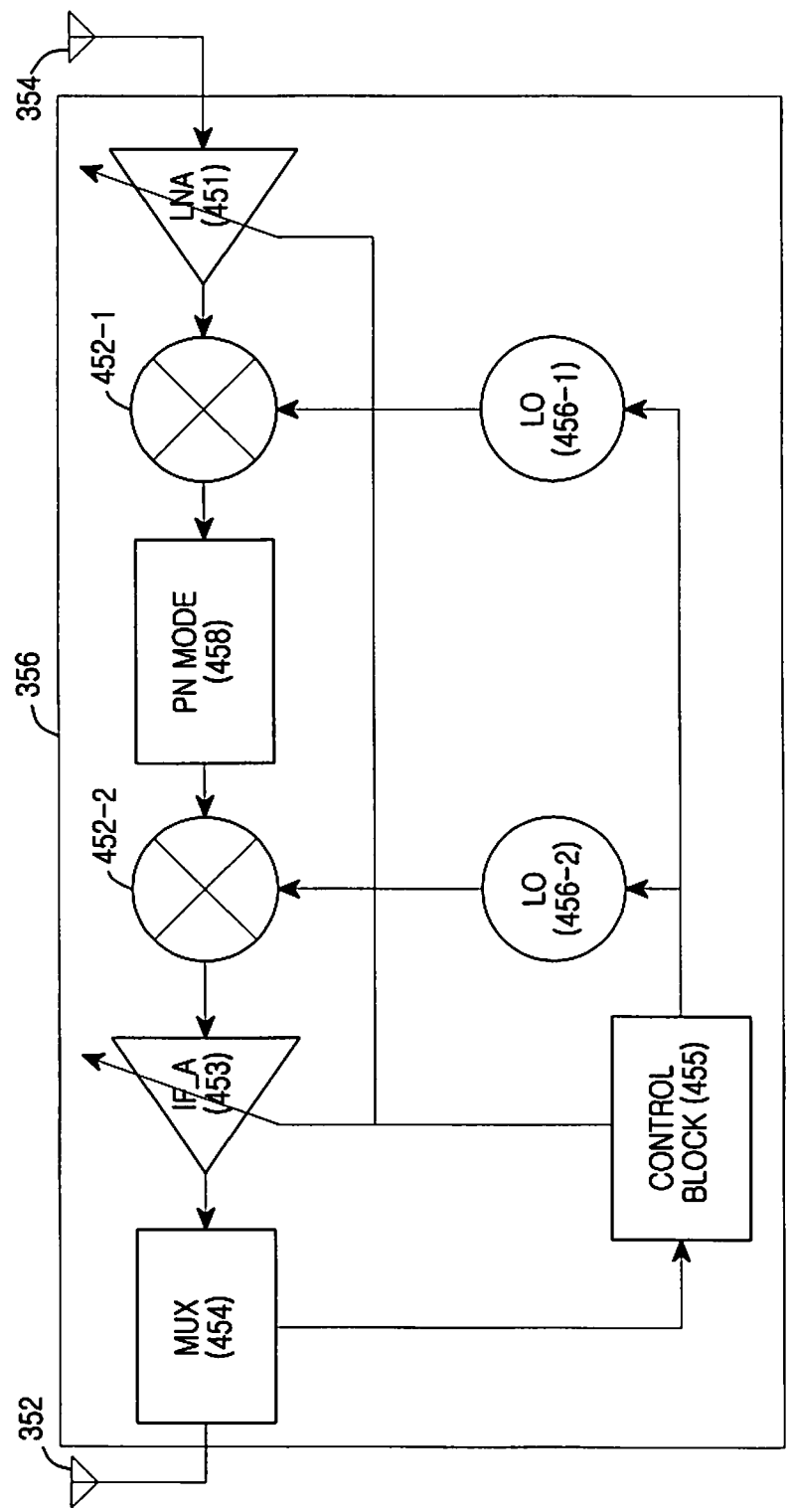

Referring to the embodiment of FIG. 4E, the retransmitter 350 includes antenna 352, antenna 354, a transmitting/receiving part, and a control part. Antenna 354 receives a main input radio-frequency signal, and antenna 352 transmits an intermediate radio-frequency signal and receives a control signal. The transmitting/receiving part includes an LNA 451 connected to antenna 354, a first mixer 452-1, a pseudo-noise modulator 458 for increasing multiuser compatibility, a second mixer 452-2, and an IFA 453. The control part includes a multiplexer 454, a control block 456, a first LO 456-1 and a second LO 456-2. The multiplexer 454 is connected to antenna 352 and the IFA 453. The control block 455 is connected to the LNA 451 and the IFA 453. The first LO 456-1 is connected to the first mixer 452-1, and the second LO 456-2 is connected to the second mixer 452-2.

Theoretical computations and experimentation have shown that the various embodiments of the present invention provide effective decreases in noise levels of an input due to the addition of one or more additional receiving radio channels with input external circuits and the antenna. The one or more additional receiving radio channels are made in the form of a transmitter/receiver that is located at a greater distance from the main transmitter/receiver. In such design at identical parameters of noise-factor for noiseless amplifiers of the transmitter/receiver and a retransmitter, the improvement of input noise of system is provided, due to decreasing of the digital noise received by the antenna of a retransmitter, which is remote enough from the transmitter/receiver. The distance of the transmitter/receiver from the retransmitter allows for the use of MIMO technology and other technologies that utilize separate receiving signaling for improving signal reception. Correlation between signals that are passed over two channels, i.e., a straight line to the transmitter/receiver and over a retransmitter, can be low enough for satisfaction of MIMO requirements and utilizing separately receiving signals.

Thus, the transmitting/receiving system in accordance with the embodiments of the present invention has an advantage of using two or more input channels to split signals at receiving and/or for application of MIMO technology. Correlation between channels is decreased, as the distance between the transmitter/receiver 300 and a retransmitter 350 can be greater than in the transmitter/receiver 300.

Another advantage of in the present invention is a reduction of digital noise received by the antenna, which is also a consequence of splitting the antenna of a retransmitter 350 and the transmitter/receiver 300, which is a source of digital noise. Reduction of a level of input noise leads to increase of sensitivity of system.

At least, two subsystems can be used for a multiuser interface; multiplexing with frequency splitting, and multiplexing with code splitting.

Although the present invention has been shown and described with reference to certain embodiments thereof, it will be understood by those skilled in the art that various changes in form and details may be made therein without departing from the spirit and scope of the present invention as defined by the appended claims.

What is claimed is:

1. A transmitting/receiving system comprising:
   a transmitter/receiver configured to receive a radio-frequency signal through a radio channel using a first antenna; and
   a retransmitter configured to receive the radio-frequency signal through one or more additional radio channels, wherein the retransmitter is located at a distance from the transmitter/receiver,
   wherein the retransmitter transforms the radio-frequency signal into an intermediate frequency signal, and transmits the intermediate frequency signal to the transmitter/receiver, and
   wherein the transmitter/receiver receives the intermediate frequency signal using a second antenna, and performs joint processing on the radio-frequency signal and the intermediate frequency signal,
   wherein the transmitter/receiver includes the first antenna, the second antenna, a multiplexer, a mixer, a receiver, a transmitter, an intermediate frequency processor, and a control module,
   wherein the retransmitter includes an antenna, a transceiver and a controller.

2. The transmitting/receiving system of claim 1, wherein the receiver comprises:
   a filter configured to filter the radio-frequency signal received though the multiplexer;
   a noiseless amplifier configured to amplify the filtered radio-frequency signal from the filter; and
   an integrated demodulator circuit configured to demodulate the amplified, filtered radio-frequency signal from the noiseless amplifier.

3. The transmitting/receiving system of claim 1, wherein the transmitter comprises:
   an integrated modulator circuit configured to modulate a radio-frequency signal to be transmitted from the transmitter/receiver;
   a power amplifier configured to amplify the modulated radio-frequency signal from the integrated modulator circuit; and
   a filter configured to filter the amplified, modulated radio-frequency signal from the power amplifier.

4. The transmitting/receiving system of claim 1, wherein the control module transmits a control signal informing a frequency and a power level of the intermediate frequency signal, and
   wherein the controller receives the control signal, and changes the frequency and the power level of the intermediate frequency signal based on the control signal.

5. A transmitting/receiving system comprising:
   a transmitter/receiver configured to receive a main input radio-frequency signal through a radio channel using a first antenna, receive an intermediate frequency signal using a second antenna, and perform joint processing on the main input radio-frequency signal and the intermediate frequency signal; and
   a retransmitter configured to receive the main input radio-frequency signal through one or more additional radio channels, transform the main input radio-frequency signal into the intermediate frequency signal, and transmit the intermediate frequency signal to the transmitter/receiver, wherein the retransmitter is located at a distance from the transmitter/receiver,
   wherein the transmitter/receiver includes the first antenna, a multiplexer, a mixer, a receiver, a transmitter, and an intermediate frequency processor,
   wherein the receiver receives through the first antenna and the multiplexer the main input radio-frequency signal,
   wherein the transmitter transmits through the multiplexer and the first antenna a main output radio-frequency signal,
   wherein the retransmitter includes a transceiver, a controller, a fourth antenna for receiving the main input radio-frequency signal, and a third antenna for transmitting the intermediate frequency signal,
   wherein the transceiver includes a noiseless amplifier, a second mixer, and an intermediate frequency amplifier connected to the third antenna,
   wherein the controller comprises a second multiplexer, a control block, and an oscillator, and
   wherein an input of the second multiplexer is connected to the fourth antenna, and an output of the second multiplexer is connected to an input of the noiseless amplifier, the control block is connected to the noiseless amplifier and the intermediate frequency amplifier, and the oscillator is connected to the second mixer.

6. A transmitting/receiving system comprising:
   a transmitter/receiver configured to receive a main input radio-frequency signal through a radio channel using a first antenna, receive an intermediate frequency signal using a second antenna, and perform joint processing on the main input radio-frequency signal and the intermediate frequency signal; and
   a retransmitter configured to receive the main input radio-frequency signal through one or more additional radio channels, transform the main input radio-frequency signal into the intermediate frequency signal, and transmit the intermediate frequency signal to the transmitter/receiver, wherein the retransmitter is located at a distance from the transmitter/receiver,
   wherein the transmitter/receiver includes the first antenna, a multiplexer, a mixer, a receiver, a transmitter, and an intermediate frequency processor,
   wherein the receiver receives through the first antenna and the multiplexer the main input radio-frequency signal,
   wherein the transmitter transmits through the multiplexer and the first antenna a main output radio-frequency signal,
   wherein the retransmitter includes a transceiver, a controller, a fourth antenna for receiving the main input radio-frequency signal, and a third antenna for transmitting the intermediate frequency signal,
   wherein the transceiver includes a noiseless amplifier connected to the fourth antenna, a second mixer, and an intermediate frequency amplifier,
   wherein the controller includes a second multiplexer, a control block, and an oscillator, and
   wherein the second multiplexer is connected to the third antenna and the intermediate frequency amplifier, the control block is connected to the noiseless amplifier and the intermediate frequency amplifier, and the oscillator is connected to the second mixer.

7. A transmitting/receiving system comprising:
   a transmitter/receiver configured to receive a main input radio-frequency signal through a radio channel using a first antenna, receive an intermediate frequency signal using a second antenna, and perform joint processing on the main input radio-frequency signal and the intermediate frequency signal; and a retransmitter configured to receive the main input radio-frequency signal through one or more additional radio channels, transform the main input radio-frequency signal into the intermediate frequency signal, and transmit the intermediate frequency signal to the transmitter/receiver, wherein the retransmitter is located at a distance from the transmitter/receiver, wherein the transmitter/receiver includes the first antenna, a multiplexer, a mixer, a receiver, a transmitter, and an intermediate frequency processor, wherein the receiver receives through the first antenna and the multiplexer the main input radio-frequency signal, wherein the transmitter transmits through the multiplexer and the first antenna a main output radio-frequency signal, wherein the retransmitter includes a transceiver, a controller, and a third antenna for receiving the main input radio-frequency signal and transmitting the intermediate frequency signal, wherein the transceiver includes a noiseless amplifier, a second mixer, and an intermediate frequency amplifier, wherein the controller includes a second multiplexer, a control block, and an oscillator, and wherein the second multiplexer is connected to the third antenna, the noiseless amplifier and the intermediate frequency amplifier, the control block is connected to the noiseless amplifier and the intermediate frequency amplifier, and the oscillator is connected to the second mixer.

8. A transmitting/receiving system comprising:

a transmitter/receiver configured to receive a main input radio-frequency signal through a radio channel using a first antenna, receive an intermediate frequency signal using a second antenna, and perform joint processing on the main input radio-frequency signal and the intermediate frequency signal; and a retransmitter configured to receive the main input radio-frequency signal through one or more additional radio channels, transform the main input radio-frequency signal into the intermediate frequency signal, and transmit the intermediate frequency signal to the transmitter/receiver, wherein the retransmitter is located at a distance from the transmitter/receiver, wherein the transmitter/receiver includes the first antenna, a multiplexer, a mixer, a receiver, a transmitter, and an intermediate frequency processor, wherein the receiver receives through the first antenna and the multiplexer the main input radio-frequency signal, wherein the transmitter transmits through the multiplexer and the first antenna a main output radio-frequency signal, wherein the retransmitter includes a transceiver, a controller, a fourth antenna for receiving the main input radio-frequency signal, and a third antenna for transmitting the intermediate frequency signal, wherein the transceiver includes an adjustable filter, which is connected to the fourth antenna, for increasing electromagnetic compatibility, a noiseless amplifier, a second mixer, and an intermediate frequency amplifier, wherein the controller includes a second multiplexer, a control block, and an oscillator, and wherein the second multiplexer is connected to the third antenna and the intermediate frequency amplifier, the control block is connected to the noiseless amplifier and the intermediate frequency amplifier, and the oscillator is connected to the second mixer.

9. A transmitting/receiving system comprising:

a transmitter/receiver configured to receive a main input radio-frequency signal through a radio channel using a first antenna, receive an intermediate frequency signal using a second antenna, and perform joint processing on the main input radio-frequency signal and the intermediate frequency signal; and a retransmitter configured to receive the main input radio-frequency signal through one or more additional radio channels, transform the main input radio-frequency signal into the intermediate frequency signal, and transmit the intermediate frequency signal to the transmitter/receiver, wherein the retransmitter is located at a distance from the transmitter/receiver, wherein the transmitter/receiver includes the first antenna, a multiplexer, a mixer, a receiver, a transmitter, and an intermediate frequency processor, wherein the receiver receives through the first antenna and the multiplexer the main input radio-frequency signal, wherein the transmitter transmits through the multiplexer and the first antenna a main output radio-frequency signal, wherein the retransmitter includes a transceiver, a controller, a fourth antenna for receiving the main input radio-frequency signal, and a third antenna for transmitting the intermediate frequency signal, wherein the transceiver includes a noiseless amplifier connected to the fourth antenna, a first mixer, a pseudonoise modulator that increases multiuser compatibility, a second mixer, and an intermediate frequency amplifier, wherein the controller includes a second multiplexer, a control block, a first oscillator, and a second oscillator, and wherein the second multiplexer is connected to the third antenna and the intermediate frequency amplifier, the control block is connected to the noiseless amplifier and the intermediate frequency amplifier, the first oscillator is connected to the first mixer, and the second oscillator is connected to the second mixer.

* * * * *